Dec. 7, 1948. H. M. WEIR 2,455,843
METHOD AND APPARATUS FOR PRODUCTION OF GEL BODIES
Filed March 10, 1944
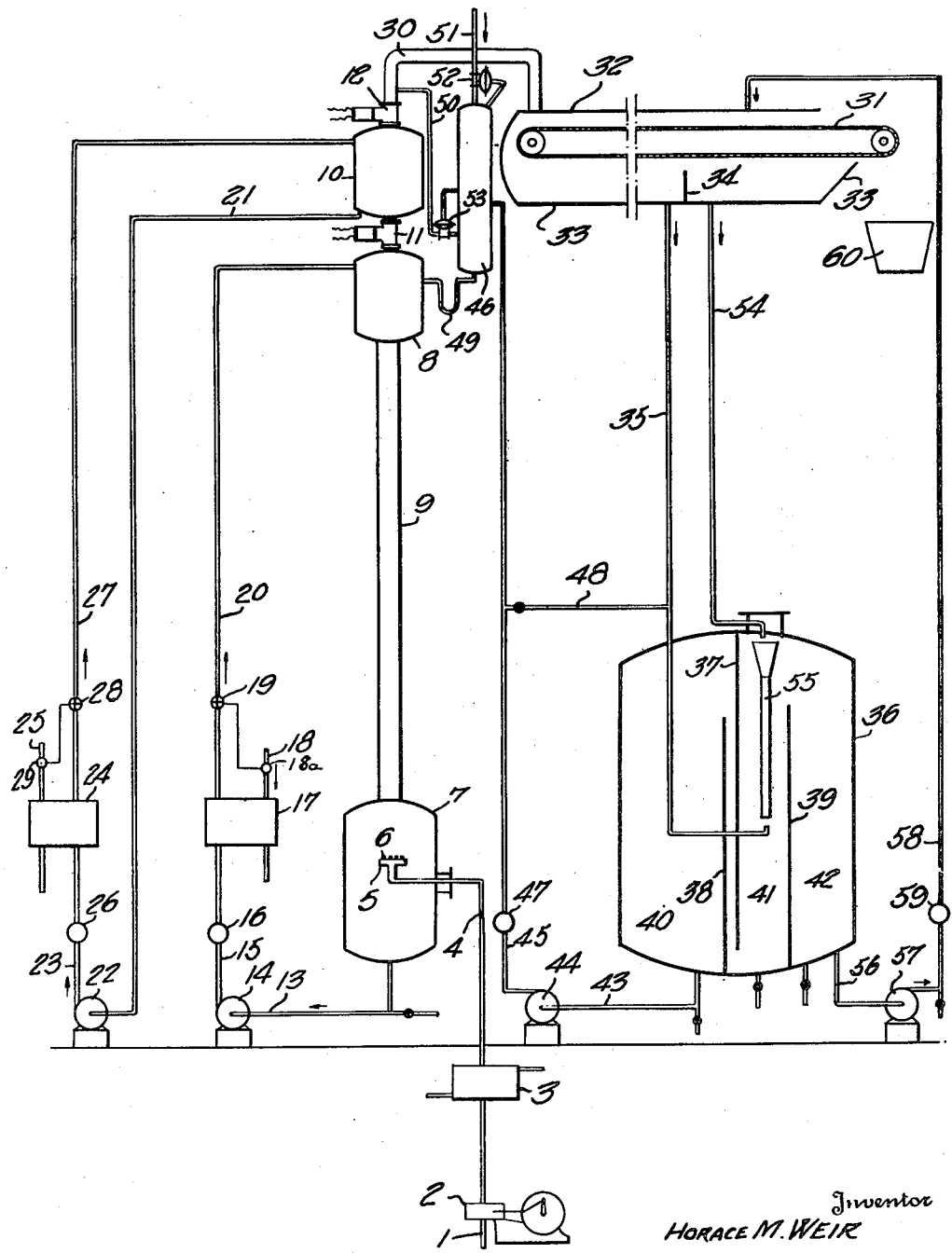
Inventor
HORACE M. WEIR
By Semmes Keegin Beale & Semmes
Attorneys Patented Dec. 7, 1948

2,455,843

UNITED STATES PATENT OFFICE 2,455,843

METHOD AND APPARATUS FOR PRODUCTION OF GEL BODIES

Horace M. Weir, Wynnewood, Pa., assignor to The Davison Chemical Corporation, Baltimore, Md.

Application March 10, 1944, Serial No. 525,938

3 Claims. (Cl. 252—317)

This invention relates in general to oxide gels and more particularly has reference to methods and apparatus for the production of small bodies of oxide hydrogel.

Oxide gels, such as silica gel, alumina gel, alumina-silica gel and others are usually made by effecting the setting of a hydrogel in large masses which are subsequently broken into smaller pieces. Under such circumstances, sizing of the gel gives rise to some problems and handling of the gel fragments which are extremely frangible results in the formation of large quantities of fines.

An object of this invention is to provide methods and apparatus for the production of gel in the form of small bodies which avoid prior art disadvantages.

Another object of this invention is to provide a method and apparatus for the formation of small discrete bodies of hydrogel by the gellation of a hydrosol.

A further object of this invention is to effect the gellation of small bodies of hydrosol in a liquid inert to and substantially immiscible with the hydrosol.

It is also an object of this invention to effect the gellation of small bodies of hydrosol in a liquid inert to and substantially immiscible with the hydrosol at super atmospheric temperatures and while under pressures sufficient to prevent boiling of the hydrosol and liquid.

Still another object of this invention is to produce a hydrogel in the form of small bodies such as spheres by discharging globules of a hydrosol from orifices submerged in a liquid inert to and substantially immiscible with the hydrosol and of a density greater than that of the hydrosol and correlating the temperature, difference in densities of the hydrosol and liquid and depth of the liquid to effect gelling of the hydrosol during movement up through the liquid to an extent sufficient to enable the globule to maintain its shape during subsequent treatment.

The present invention has as a further object the setting or gellation of a hydrosol in a liquid inert to and substantially immiscible with the hydrosol and of a density less than that of the hydrosol. Other objects of this invention will appear more fully in the description of the invention hereinafter given.

In order to facilitate an understanding of the present invention, reference is made to the accompanying drawing.

In the drawings:

The single figure is a diagrammatic representation of apparatus suitable for the production of hydrogel in the form of small bodies.

In carrying out the present invention, a hydrosol such as a silica hydrosol prepared by the mixing of solutions of a silicate such as sodium silicate, and an acid such as sulphuric acid is used.

The hydrosol of any suitable composition is drawn through the conduit 1 to the pump 2 which is of the metering type and is constructed and operated to force predetermined quantities of a hydrosol into the apparatus. The hydrosol discharged from the metering pump 2 flows into a heat exchanger 3, in which the temperature of the hydrosol is adjusted to a value which will facilitate the gelling or setting of the hydrosol during the subsequent treatment.

Hydrosol of the desired temperature discharged from the heat exchanger 3, flows through the conduit 4 to the distributor head 5 which contains a plurality of small nozzles 6, the orifices of which are of a predetermined size. As indicated, the distributor 5 is located in the lower portion of the setting or gelling apparatus.

The gelling or setting apparatus is constructed in the form of a lower vessel having a base 7 and an upper portion 8 which are connected by means of a tube 9. It is, of course, within the concept of the present invention to construct the lower vessel of the setting or gelling apparatus so that it is of substantially the same transverse dimensions from the base 7 to the upper portion 8. In the top of the upper portion 8, there is provided an opening which communicates with an upper vessel 10 through a gate valve 11. At the top of the upper vessel 10 there is provided an opening which is also controlled by a gate valve 12.

At the base of the lower vessel there is provided a discharge opening which communicates by means of a conduit 13 with a pump 14, the discharge of which is forced through a conduit 15. Provided in the conduit 15 is an indicating device 16, indicating the rate of flow of the liquid through the pump 14. Conduit 15 feeds the liquid discharged from the pump 14 through a heat exchanger 17 in which the temperature of the liquid is raised by heat exchange relation with a heating medium such as steam, fed thereto by conduit 18. A temperature responsive control device 19 is positioned in the conduit 20 through which the heated liquid is discharged from the heat exchanger 17. The temperature responsive device 19 is adapted to control a valve 18a in the conduit 18 for supplying the heating medium to the heat exchanger. Conduit 20 communicates with the upper portion 8 of the lower vessel of the setting apparatus. This equipment provides a circulation of a liquid in the lower vessel of the setting or gelling apparatus downwardly through said apparatus and provides for the heating of the liquid in the circuit through which it is caused to flow after withdrawal from the lower portion of the lower vessel prior to its reintroduction into the upper portion thereof.

At the bottom of the upper vessel 10, there is provided a discharge opening which communicates with a conduit 21, which in turn communicates with the intake port of a pump 22. The discharge from the pump 22 is fed through a conduit 23 to a heat exchanger 24, in which the liquid discharged from pump 22 is cooled by flow in heat exchange relation with a cooling medium such as water fed from the conduit 25.

Between the discharge of the pump 22 and the heat exchanger 24, the conduit 23 is provided with a flow indicator or meter 26 by means of which the rate of flow of the liquid through the conduit 23 can be ascertained.

In order to control the temperature in the heat exchanger 24, the conduit 27 through which the liquid discharged from the heat exchanger 24 flows, is provided with a temperature responsive control device 28, which is adapted to control the valve 29 which regulates the flow of cooling medium from pipe 25 into the heat exchanger 24. As indicated in the drawing, the conduit 27 communicates with the top of the upper vessel 10, thereby completing the liquid flow circuit from the bottom of the vessel 10 through the pump 22, flow meter 26, and heat exchanger 24 to the top of the vessel 10. This creates a downward circulation of liquid through the vessel 10.

Gate valves 11 and 12 are electrically actuated and are controlled by a cycle timer, as will be more fully described hereinafter.

In effecting the gelling of a hydrosol in the apparatus just described, the apparatus is completely filled with a process liquid inert to the hydrosol and immiscible therewith. This liquid should have a density greater than that of the hydrosol to be gelled. With the valves 11 and 12 closed, the pumps 14 and 22 are actuated to create a slow downward movement of the liquid in the lower and upper vessels of the gelling or setting apparatus. During the circulation of the liquid through the upper and lower vessels, the temperature of the liquid in the lower vessel is raised to a value ranging from about 100° C. to above 150° C. and the temperature of the liquid circulating through the upper vessel is maintained at a somewhat lower temperature which may be approximately room temperature, and should in any case be below 100° C.

With the lower and upper vessels filled with the process liquid, a hydrosol of desired composition is forced by the pump 2 through conduit 4 into the distributing device 5 and through the nozzles 6 thereof into the process liquid in the lower portion 7 of the lower vessel. The hydrosol may be heated to a temperature approximating that of the liquid in the lower vessel. Pump 2 is so constructed with relation to the number of discharge nozzles 6 and the orifices of the latter, that for each stroke of the pump, a plurality of small globules of hydrosol will be discharged from said nozzles. The globules discharged from the nozzles 6, being of a density less than that of the inert process liquid contained in the apparatus and substantially immiscible therewith will slowly rise through said liquid toward the upper portion 8 of the lower vessel. In rising through the process liquid, the globules of the hydrosol will tend to form into sphere-like particles and during the travel of these sphere-like particles up through the process liquid, setting or gellation of the hydrosol is effected to produce particles of hydrogel.

The degree of gellation or conversion of the hydrosol into a hydrogel may vary, but in any event, it is of an extent sufficient to maintain the globules or particles in the shape which they assume during the travel up through the inert process liquid so that the globules or particles may be subsequently treated and handled without damage thereto.

The difference in density of the process liquid and the hydrosol, the rate of flow of the process liquid downwardly through the lower vessel of the setting apparatus and the temperature of the process liquid and hydrosol and the distance between the distributor 5 and the upper portion 8 of the lower vessel are so correlated that during the time required for the globules to pass from the distributor to the upper portion 8 of the lower vessel sufficient gellation or setting of the hydrosol will be effected.

After a definite quantity of the sphere-like globules of the set or partially set hydrosol are accumulated in the upper portion 8 of the lower vessel, the valve 11 may be opened to permit all or a portion of the globules to pass into the vessel 10. Since the process liquid in the upper portion 8 of the lower vessel and in the upper vessel 10 are the same, differing merely in their temperatures, the globules will readily pass upwardly into the vessel 10. After a definite quantity of the globules have passed into the vessel 10, the valve 11 may be closed and the cool process liquid circulated downwardly through the set or partially set globules to reduce their temperature and effect further setting thereof if incompletely set. Cooling of the gelled particles in the vessel 10, of course, reduces the vapor pressure of the process liquid surrounding the same and entrained thereby so that the gelled globules may be discharged from the vessel 10 into the atmosphere without any appreciable loss of the process liquid due to vaporization. When it is desired to discharge the gelled globules from the vessel 10, the valve 12 is opened and the gelled bodies, together with entrained process liquid, will be discharged through the conduit 30.

In accordance with the present invention, means are provided for separating the process liquid from the gelled bodies discharged from the conduit 30. For this purpose, an endless belt conveyor 31 is provided. This conveyor may be made of metal links having a very substantial portion of free area for the liquid to drain from the gelled bodies received thereon. The openings in the belt are small enough so that the gel bodies will be retained and the entrained process liquid may drain therefrom as the gel is carried on the conveyor. A suitable collection trough 33 is provided beneath the conveyor 31 to receive the liquid draining from the gelled bodies. The trough 33 may be provided in the bottom of a housing 32 in which the conveyor 31 extends, or it may be a separate vessel positioned beneath an exposed endless conveyor 31, the housing 32 being omitted.

It has been found that draining of the process liquid from the gelled bodies is not sufficient and that there will still remain a slight film of process liquid on the gelled bodies which must be removed by a further treatment. In accordance with the present invention, the remaining film of the process liquid may be displaced by subjecting the gelled bodies while on the endless conveyor 31 to the action of an aqueous medium such as water or water containing a wetting agent. The washing medium, together with the process liquid displaced thereby is collected in the trough 33 beneath the conveyor 31. It is desirable to maintain the pure process liquid collected in the trough 32 separate from the mixture of process liquid and aqueous medium and for this purpose the trough 33 may be provided with a partition 34.

The process liquid collected in the trough 33 on one side of the partition 34 is removed from the trough through a conduit 35 which discharges in a separating tank 36. The tank 36 is provided with a baffle 37 extending from the top of the tank down to a point spaced from the bottom thereof. On one side of the baffle 37 there is a baffle or partition 38 which extends from the bottom of the tank 36 up to a point spaced from the top of said tank. On the opposite side of the baffle 37 there is provided a baffle or partition 39 which also extends upwardly from the bottom of the tank to a point spaced from the top thereof. As will be noted, the upper edge of the baffle 38 terminates at a level slightly lower than that of the upper edge of the baffle 39. Baffles 38 and 39 in effect divide the tank 36 into a compartment 40 for the inert process liquid, a compartment 41 for a mixture of the process liquid and the aqueous medium, and a compartment 42 for the separated aqueous medium. The process liquid employed in the present invention is of a density greater than 1, preferably 1.1 or more, and will consequently form the lower of superposed layers of the process liquid and an aqueous medium. The process liquid will flow over the top of the baffle 38 and the layer of aqueous medium on the surface thereof, will overflow the upper edge of the baffle 39.

Compartment 40 has a discharge conduit 43 extending from the bottom thereof which feeds to the intake of a pump 44. A conduit 45 receives the discharge from the pump 44 and conducts the same upwardly to a ballast tank 46. A flow meter 47 is interposed in the conduit 45 for indicating the rate of flow of the process liquid therethrough. A bypass 48 extends between the conduits 45 and 35 and is provided with a valve for controlling the quantity of liquid bypassed therethrough.

A portion of the process liquid received in the ballast tank 46 may be fed therefrom through a conduit 49 to the upper portion 8 of the lower vessel. Another portion of the liquid from the ballast tank 46 is fed through a pipe 50 into the intake end of conduit 30, thus creating a flow of process liquid through the conduit 30 from the valve 12 to the discharge end of the conduit 30. The ballast tank 46 communicates with a pipe 51 which is supplied with compressed air at a fairly high pressure. A valve 52 controls the flow of compressed air from the pipe 51 into the tank 46, the pressure control valve being responsive to the pressure of fluid in the tank 46. With this construction a definite pressure can be maintained on the liquid within the lower vessel of the gelling apparatus which is determined by the setting of the valve 52.

The flow of the liquid from the tank 46 through the pipe 50 is controlled by a valve 53 which is responsive to the pressure within the tank 46 and permits the liquid to be discharged through the pipe 50 at a pressure lower than that maintained in the tank 46.

From the foregoing, it will be appreciated that the process liquid recovered by draining of the gel bodies is returned to the process to replace losses therein, and it is utilized as a medium for carrying the gel bodies through the conduit 30 onto the conveyor 31.

The mixture of liquid collected in the trough 33 on the other side of the baffle 34 consists of a major portion of aqueous medium and a smaller portion of the process liquid removed from the gel bodies by the aqueous medium. This mixture is discharged through conduit 54 and is fed through the quiescent feed device 55 into the compartment 41 of the tank 36. The mixture separates in the compartment 41 to form a layer of the aqueous medium on the upper surface of the process liquid. Due to the difference in density of the process liquid and the aqueous medium, the level of the combined process liquid and aqueous medium on the right side of the baffle 37 in compartment 41 will be higher than the level of the process liquid on the left side of the baffle 37. The height of the baffles 38 and 39 is so constructed that the aqueous medium will spill over the top of the baffle 39 and the process liquid will spill over the top of the baffle 38.

Aqueous medium collected in the compartment 42 of tank 36 is withdrawn therefrom through the conduit 56 by means of a pump 57 and is discharged into a conduit 58 for return to the housing 32 in which it is sprayed over the gel bodies supported on the endless conveyor 31. A flow meter 59 may be provided in conduit 58 to indicate the rate of flow of the aqueous medium therethrough.

Gel bodies on the conveyor 31 after having the process liquid drained therefrom and rinsed therefrom, are discharged into a receiver 60 which may be the top of a continuous washer for removing substances from the hydrogel resulting from the reaction producing the hydrosol.

During operation of the apparatus shown in the drawings, the valves 11 and 12 may be electrically controlled by a cycle timer (not shown) to operate them in the proper sequence to control the up flow of the gel bodies. The valves may be opened simultaneously for a brief period of time only if the process is being carried out at a temperature in vessels 8 and 9 which is less than 100° C. or valve 12 may be opened to discharge the contents of vessel 10 while valve 11 is closed and the valve 11 opened while valve 12 is closed for the filling of vessel 10.

While reference has been made in the foregoing description to the gellation of a silica hydrosol, the present invention is, of course, equally applicable to the setting or gellation of other hydrosols or mixtures of hydrosols.

In carrying out the invention as hereinbefore described, the process liquid into which the globules of hydrosol are discharged should have the properties of being inert to the hydrosol and substantially insoluble or substantially immiscible in water and in the hydrosol. Furthermore, the process liquid should have a density at the temperature of operation of the process which is greater than that of the hydrosol. This means that normally the density of the process liquid is greater than 1.1. Preferably the boiling point of the process liquid should be above 100° C., but this is by no means necessary. If, however, the boiling point is above 100° C., the losses due to vaporization will be smaller than if a material having a lower boiling point is used. With the construction shown in the figure of the drawings in which the upper vessel 10 is provided and the liquid therein cooled, the losses due to vaporization are much less even with a process liquid boiling below 100° C. than is the case if the process is carried out in apparatus in which a single bath of process liquid is employed and in which the gel bodies are collected from the upper portion of the heated bath.

Furthermore, by maintaining the process liquid under a pressure above atmospheric, the boiling point of the same is elevated. By application of pressure to the process liquid, the operating temperature may be increased to desired values. It has been found that the time of setting may be reduced and the strength or toughness of the hydrogel produced can be increased by effecting the gellation at higher temperatures. Operating temperatures of 150° C., 200° C. and higher have been found suitable for effecting the gellation of hydrosols in accordance with the present invention. When operating at these high temperatures the pressure should be maintained high enough to prevent boiling of the process liquid and the hydrosol.

It is to be understood that the process liquid employed may be any liquid which is suitable for the purpose. In some instances, it has been found desirable to adjust the density and viscosity of a selected liquid to an optimum value. For example, a fairly dense liquid may be selected, and its density reduced by mixing therewith a suitable hydrocarbon oil.

If a light or heavy lubricating oil is utilized as the diluent, the viscosity of the liquid at the operating temperature may be adjusted more or less independently of the density. It is obvious that there is a wide choice of organic liquids which meet the criteria above mentioned relative to the properties of the process liquid. The following lists the physical properties of three liquids which were found satisfactory for carrying out the process of the invention.

|  | Density | B. P., °C. | Solubility in water, g/100 cc. | M. P., °C. |
|---|---|---|---|---|
| Ethylene Dichloride | 1.245 | 83.7 | 0.87 (20) | −19 |
| Dichlorobenzene (Mostly Ortho) | 1.28 | 178–180 | 0.01 | |
| Nitrobenzene | 1.19 | 210 | 0.19 (20° C.) 0.80 (80° C.) | 5 |

The choice of the process liquid should be correlated with other factors in the process. For instance, the depth of the process liquid, the rate of downward flow of the process liquid through the apparatus, and the temperature of the process liquid should be correlated. It has been found that when using a process liquid selected from the above listed group and the depth of the process liquid is about 40 feet, the temperature should be substantially above 100° C., and as high as a temperature in excess of 150° C., and the rate of downward circulation should be substantially less than one foot per second.

Of course, when desired, the operation temperature may be 150° C., 200° C. or higher as explained hereinbefore, in which case the pressure is raised correspondingly to avoid boiling.

The conditions, of course, may vary in that the depth of the liquid may be greater or less than the value given, the rate of flow of the liquid downwardly through the apparatus may be varied, the density of the liquid may be varied, and the temperature of operation may also be varied. In any event, the above mentioned properties and conditions are so selected and correlated as to produce the desired results. It has been found that when the conditions are so correlated as to maintain the globules of hydrosol in contact with the process liquid for about three minutes, effective gellation of a sufficient extent to enable subsequent handling of the gel bodies is obtained.

When the gel bodies are formed in equipment similar to that shown in the drawing, there is a curing or further gelling action produced in the upper vessel 10, and even after the gel bodies are discharged onto the conveyor 31, the process of curing or further gellation continues if not already completed.

While reference has been made to the apparatus diagrammatically shown in the accompanying drawing, in describing the present invention, it is to be understood that the setting or gellation of the globules of hydrosol may be effected by discharging the same through submerged orifices in the lower portion of a bath of liquid having the properties and under the conditions set forth hereinbefore, and collecting the gelled or set bodies by removing them directly from the upper portion of the bath without sending them first through a cooling zone corresponding to the upper vessel 10. The vessel containing the liquid bath may be of any desired shape. A suitable conveyor mechanism may be provided for carrying the floating gel bodies in their set or partially set condition directly from the upper portion of the bath. While on the conveyor the gel bodies may be subjected to the draining and washing actions corresponding to those set forth in connection with the description of the apparatus illustrated in the drawing.

Before the gel bodies are subjected to the washing action for removal of soluble compounds therefrom, they may be subjected to a further treatment to cure or complete the conversion of the hydrosol into a hydrogel. This may be effected by moving the gel bodies at low temperature on an extended conveyor which finally discharges the gel into the washing equipment.

Instead of subjecting the gel while on the conveyor 31 or equivalent apparatus to a washing action to recover the entrained process liquid, the latter may be recovered in the subsequent washing of the gel bodies to remove the soluble compounds therefrom.

In some instances, the hydrosol may be cooled and maintained at a low temperature until brought into contact with the process liquid to avoid gellation until such contact is effected.

The washing medium employed for removing the film of process liquid from the gel bodies while the latter are on the conveyor 31 may consist substantially of water or water to which has been added a wetting agent, such as, for example, a fractional percent of castile soap or one of the sulphonated esters on the market, such as those sold under the trade name "Gardinol."

Other suitable wetting agents which facilitate the washing of the film of process liquid from the gel bodies may be used. The washing liquid should be distributed in such quantities and in such a pattern as to substantially completely free the gel bodies of all adhering organic process liquid. An important property of the washing liquid is that the organic process liquid should not dissolve therein. The washing action is considered to be a displacement action with possibly some transient emulsive action so that a two-phase mixture of liquids is collected in the trough 33 and discharged into the compartment 41.

While the foregoing description refers to the use of a process liquid which has a density greater than that of the hydrosol, it is, of course, within the concept of the present invention to utilize a process liquid of a density less than that of the hydrosol. Such a liquid may be a petroleum hydrocarbon such as varnish makers naphtha or other liquids inert to and substantially immiscible with the hydrosol and of a density less than one.

When the process is carried out utilizing a process liquid of a density less than that of the hydrosol the small bodies of hydrosol should be introduced into the upper portion of the bath of setting or process liquid so that by reason of the difference in density, the bodies of hydrosol will move downwardly through the bath. In this instance the flow of the process liquid through the apparatus will be upwardly through the setting or gelling vessel and the velocity of flow will be controlled and correlated with the other factors of the process in the manner hereinbefore described in connection with the use of a process liquid of a density greater than that of the hydrosol to control the movement of the bodies through the bath.

In case this procedure is used, whereby gel bodies are caused to move to the bottom of the layer of process liquid, final removal of said bodies from the apparatus either immediately, or after traversing a cooling section corresponding to vessel 10 of the present description, may be effected by a double lock arrangement, similar to the valves 11 and 12, at the lower end of the vessel corresponding to the lower vessels 7, 8, and 9.

Of course many variations in the equipment may be made without departing from the scope of this invention.

Among other variations which will be obvious to those acquainted with the art is the possibility of adapting my process as follows: Injection of hydrosol at the base of the apparatus for example, into the base 7 of the lower vessel, may be accomplished in case a process liquid having a density less than that of the hydrosol is used, provided circulation of the said process liquid and hydrosol bodies is arranged with upward flow of sufficient velocity to overcome the tendency of the hydrosol bodies to sink in the lower density liquid. Likewise, injection of hydrosol at the top of the apparatus in a manner just described may be effected with a process liquid having a density greater than that of the hydrosol providing circulation in the downward direction is arranged to offer a velocity great enough to overcome the tendency to rise of said hydrosol.

From the foregoing, it will be appreciated that the present invention provides for the production of hydrogels in the form of small spheres which may be handled in further treatment without incurring the disadvantages of the prior art.

I claim:

1. A method of gelling silica and other oxide hydrosols comprising forming small bodies of the hydrosol in a substantially immiscible liquid at a temperature above the atmospheric boiling point of the hydrosol, moving the bodies through the immiscible liquid, circulating the immiscible liquid in a direction countercurrent to the direction of movement of the bodies, correlating depth and the rate of circulation of the immiscible liquid to maintain the hydrogel in the liquid until the desired gellation has been effected, subsequently and without substantial reduction of pressure passing the gelled bodies into a zone of cooler immiscible liquid, moving the gelled bodies through the cooler liquid whereby said gel bodies are cooled to a temperature below the atmospheric boiling point of the liquid phase of said gelled bodies, circulating the cooled liquid countercurrent to the movement of the bodies, reducing the maintained pressure to substantially atmospheric pressure, and removing the gelled bodies from the liquid.

2. An apparatus for the formation of small bodies of hydrogel from an inorganic oxide hydrosol comprising a lower vessel for receiving a bath of an inert liquid substantially immiscible with the hydrogel, and of a density greater than that of the hydrosol, a second vessel positioned above and communicating through its lower portion with the upper portion of the lower vessel, means controlling commuunications between said vessels, means for withdrawing liquid from the lower portion of the lower vessel and introducing it into the upper portion of said lower vessel, means for withdrawing liquid from the lower portion of the upper vessel and introducing it into the upper portion of said vessel, and means for introducing small globules of the hydrosol into the bath at the bottom of the lower vessel.

3. An apparatus for the formation of small bodies of hydrogel from an inorganic oxide hydrosol comprising a lower vessel for receiving a bath of an inert liquid substantially immiscible with the hydrogel, and of a density greater than that of the hydrosol, a second vessel positioned above and communicating through its lower portion with the upper portion of the lower vessel, means controlling communications between said vessels, means for withdrawing the liquid from the lower portion of the lower vessel and introducing it into the upper portion of said lower vessel, means for heating the liquid withdrawn from the lower portion of the lower vessel before it is introduced into the upper portion of said lower vessel, means for withdrawing the liquid from the lower portion of the upper vessel and introducing it into the upper portion of the vessel, means for cooling the liquid withdrawn from the upper vessel before it is reintroduced into said upper vessel, and means for introducing small globules of the hydrosol into the bath at the bottom of the lower vessel.

HORACE M. WEIR.

REFERENCES CITED

The following references are of record in the file of this patent:

UNITED STATES PATENTS

| Number | Name | Date |
|---|---|---|
| 679,575 | Reese | July 30, 1901 |
| 1,019,111 | Wright | Mar. 5, 1912 |
| 1,195,099 | Salm | Aug. 15, 1916 |
| 1,614,636 | Wachtel | Jan. 18, 1927 |
| 1,907,455 | Stenzel | May 9, 1933 |
| 2,232,727 | Peterkin et al. | Feb. 25, 1941 |
| 2,249,746 | Colbeth | July 22, 1941 |
| 2,258,111 | Engel | Oct. 7, 1941 |
| 2,284,248 | Baker et al. | May 26, 1942 |
| 2,339,114 | Scherer | Jan. 11, 1944 |
| 2,384,455 | Daley | Sept. 11, 1945 |
| 2,385,217 | Marisic | Sept. 18, 1945 |
| 2,422,499 | Pierce et al. | June 17, 1947 |

FOREIGN PATENTS

| Number | Country | Date |
|---|---|---|
| 12,908 | Great Britain | 1909 |
| 15,365 | Great Britain | 1915 |

OTHER REFERENCES

Truscott Ore Dressing, MacMillan, 1923, page 208.